Patented July 23, 1940

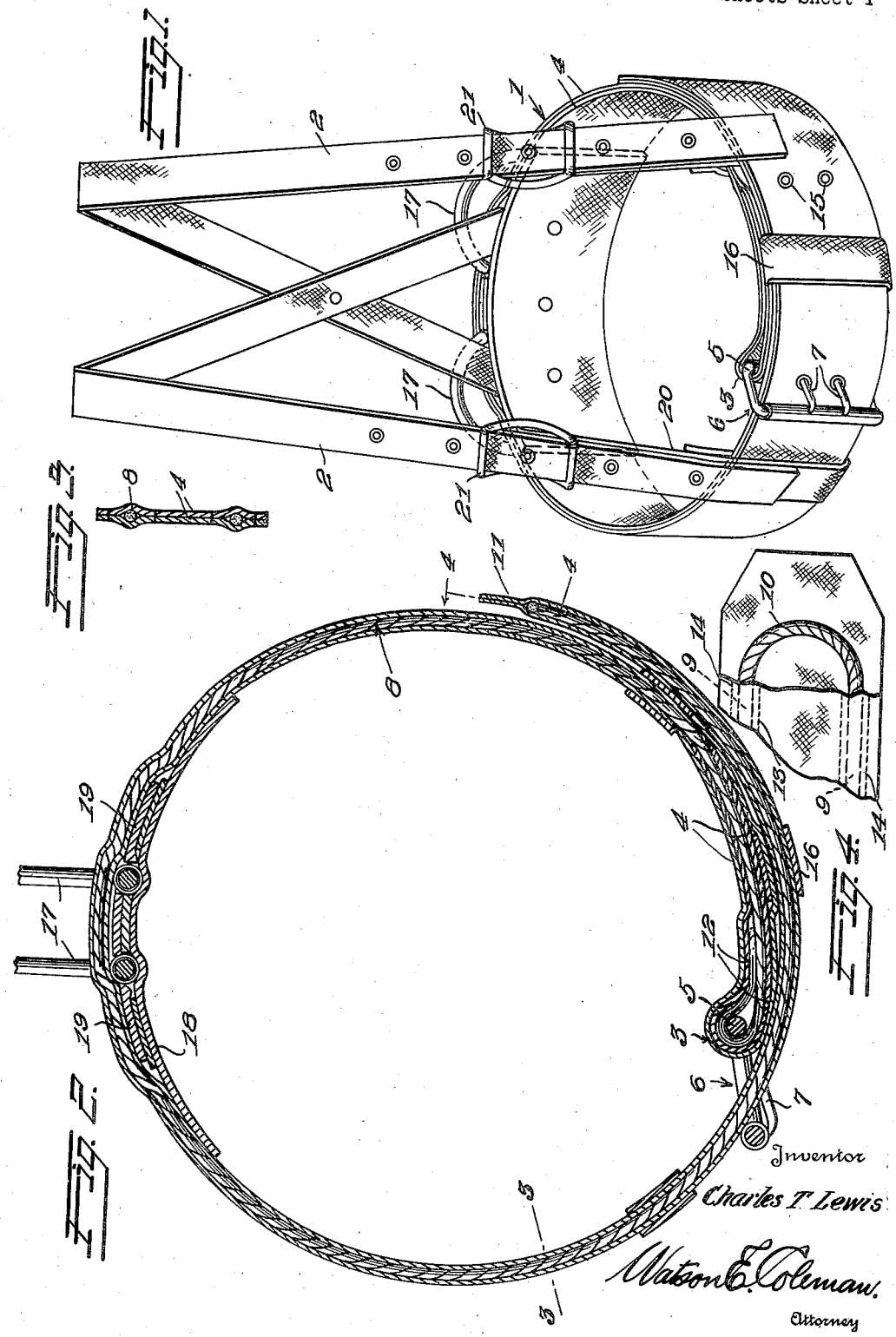

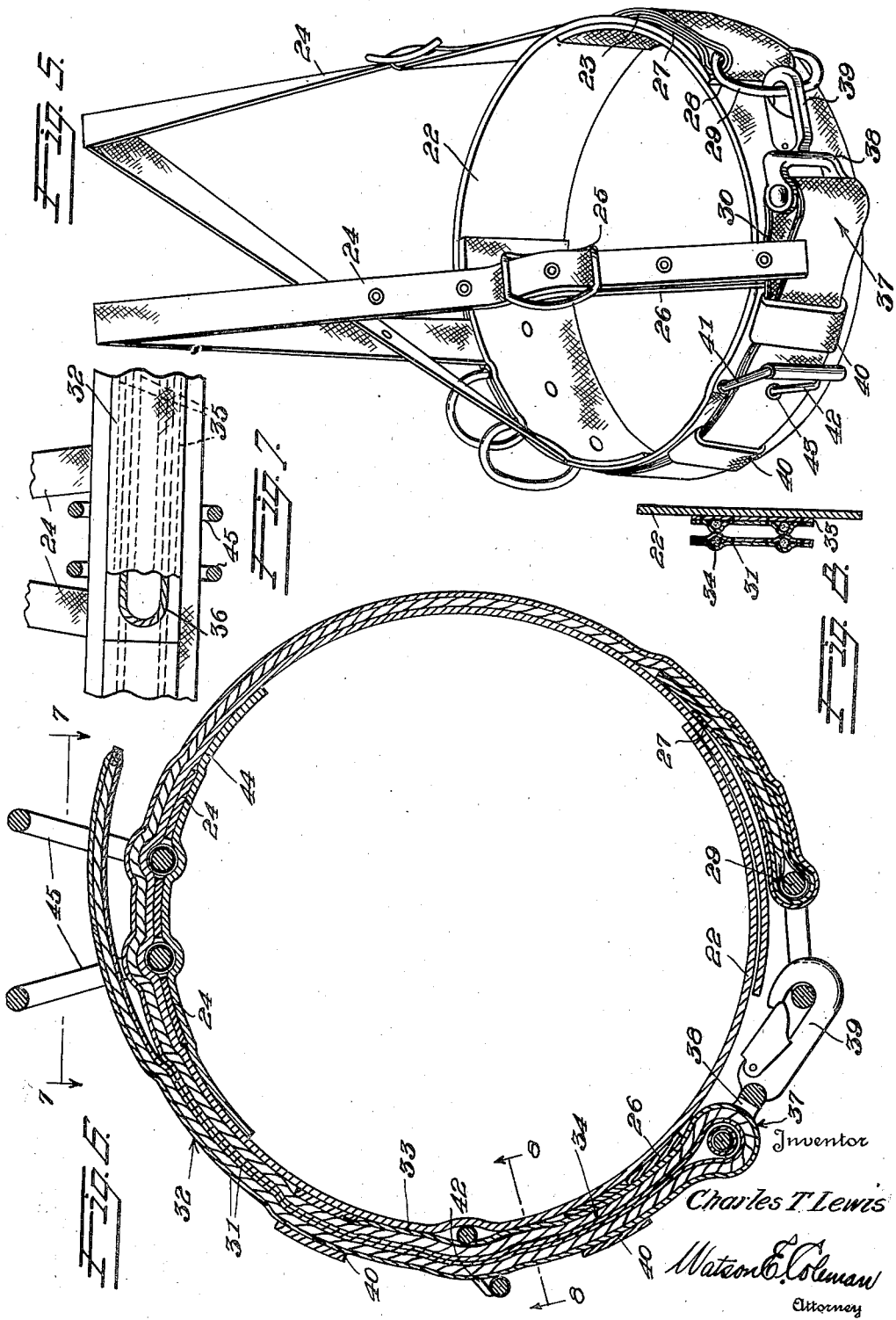

2,208,990

UNITED STATES PATENT OFFICE 2,208,990

REINFORCED SAFETY BELT

Charles T. Lewis, Oklahoma City, Okla.

Application March 28, 1940, Serial No. 326,485

3 Claims. (Cl. 227—49)

This invention relates to improvements in safety belts or straps such as are commonly employed by oil well derrick men, window washers or other persons who are required to work in high exposed positions, and the present invention is directed particularly to a novel reinformed belt construction.

In the use of safety belts or safety harness such as is commonly employed by oil well derrick men, window washers, telephone linemen and others, the material of such belts, particularly those worn by oil well workmen, frequently deteriorates to the point where continued use of the belt becomes a great hazard, but such deterioration is difficult to detect and, therefore, the user might continue with a belt which is in bad condition without his being aware of this fact.

The primary object of the present invention is to provide in the construction of such safety belts, a reinforcing means which will safeguard the user of the belt against accident if the material of which the belt is composed becomes weakened to a dangerous extent where it might give way while the belt is in use, such reinforcing being so combined or built into the belt structure as to be practically unnoticeable and so that it will not be uncomfortable to the wearer or make the belt stiff or otherwise difficult to handle.

A further object of the invention is to provide in a safety belt, a reinforcing construction which will function if the material of the belt should break or give way, to check or hold the parts of the belt from separating or opening so as to release the wearer from the circle or band which the belt forms around his body.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in perspective of a safety belt constructed in accordance with the present invention in the body portion of which the improved reinforcement is incorporated.

Fig. 2 is a horizontal section through the belt in a plane above one loop of the reinforcing strand showing its interposition between the layers or laminations of the belt.

Fig. 3 is a section taken on the line 3—3 of Fig. 2.

Fig. 4 is a sectional view on the line 4—4 of Fig. 2.

Fig. 5 is a view in perspective of another form of safety belt such as is employed by oil field derrickmen, in which the present reinforcing feature is incorporated.

Fig. 6 is a horizontal section through the belt structure of Fig. 5 in a plane above and looking down upon a loop of the reinforcing strand.

Fig. 7 is a sectional view on the line 7—7 of Fig. 6 with parts broken away.

Fig. 8 is a sectional view on the line 8—8 of Fig. 6.

Referring now more particularly to the drawings, reference will first be made to the structures shown in Figs. 1 to 4, inclusive, wherein the belt is of somewhat simpler design than the one shown in Fig. 5. In carrying out the present invention, the belt structure shown in Fig. 1 is made up of a belt body portion 1 and shoulder straps 2. The body 1, which may be of suitable heavy canvas or duck, leather or any other desired material, comprises preferably a single length of such material bent transversely midway of its ends to form a buckle ring loop 3 and having the two portions thus formed by such bending brought together in side by side relation to form two laminations 4.

In the loop 3 there is engaged a side bar 5 of a buckle ring which is indicated generally by the numeral 6, to which bar are pivotally connected the buckle prongs or fingers 7.

Interposed between the laminations 4 is a single strand of light weight woven steel cable which is indicated generally by the numeral 8. This strand has both of its ends passed around the bar 5 and spliced to the strand so that it thus forms two loops which lie in spaced parallel relation between and extend throughout the lengths of the laminations 4 of the belt, each of these loops being designated by the numeral 9. The continuous strand of reinforcing cable thus has its two loop portions 9 joined at the end of the belt remote from the buckle ring 6 by the bight portion 10 which lies in close proximity to the two ends of the strip of material which forms the two laminations 4, such ends being designated by the numeral 11. A short strip of the belt material is looped around the buckle ring bar 5 as indicated at 12, passing between the bar and the looped portion 3 of the belt material and having its ends extended in side by side relation between the laminations, as is clearly shown in Fig. 2. This provides not only a reinforcement but a wear piece to prevent the double strands of the reinforcement cable from cutting through the fabric or the material of which the belt is composed.

After the laminations of the belt have been arranged with the reinforcing strands 9 interposed therebetween, the laminations are stitched together along the inner and outer lines 13 and 14, respectively, as shown in the fragmentary view constituting Fig. 4, such lines of stitching running along the two sides of the strands 9 of the reinforcing cable. At the tip or end of the belt the lines of stitching continue to follow the curvature of the bight portion of the reinforcing strand and the tips 11 are additionally joined together to prevent fraying and wear by impregnating them with a suitable rubber composition which fills the pores of the material and binds the tips together.

The end of the belt remote from the end to which the buckle is attached, is provided with a series of pairs of grommets 15 to receive the buckle pins 7, and it will be noted that these pairs of grommets lie between the loops 9 of the reinforcing strand.

The body of the belt adjacent the buckle end is provided with the usual retaining loops 16 in which the end of the belt is inserted after it has passed through the buckle in the usual manner.

At the back of the belt safety rings 17 are attached by the expedient of passing the belt through the rings and then covering the rings upon the inner side of the belt by the inner shield strip 18, as shown in Fig. 2. Suitable fill out pieces 19 are inserted between the safety rings and at the opposite sides thereof so that there will not be made a too abrupt change in the contour of the inner side of the belt which would cause discomfort to the wearer.

The shoulder straps are preferably arranged in crossed relation as shown, and each is secured at one end at the back of the belt between the shield strip 18 and a fill out piece 19 while at the front each shoulder strap includes a port buckle carrying strip 20 which is joined to the belt in any suitable manner. The buckle carried by the strip is indicated at 21 and facilitates the attachment of the free ends of the shoulder straps to the front of the belt.

The belt structure shown in Figs. 5 to 8 and which forms the subject-matter of my Patent #2,130,724 of September 20, 1938, comprises two main waist encircling portions, one of which is relatively wide and indicated by the numeral 22, the other portion being indicated by the numeral 23 and extending around the outer side of the side portion 22 to which it is integrally attached, this portion 23 being materially narrower than the portion 22, as shown. Shoulder straps attached at their rear ends to the inner side of the wide portion in the same manner as the straps 2 of the structure of Fig. 1, are indicated by the numeral 24, the free ends of these straps being joined by buckles 25 with the short attaching straps 26 which are connected to the front part of the belt.

The portion 22 of this belt may consist of a single strip of leather or woven material or it may be made up of a number of laminations of woven material or leather, as may be desired. The narrow portion 23 is preferably formed of a single band of material which at one end is bent back upon itself forming the inturned tongue 27 which is placed against the outer side of the portion 22 forming a loop 28 through which engages the D ring 29. This narrow band extends around the wide portion 22 and is secured thereto from adjacent the loop 28, which lies adjacent one end of the portion 22, as shown in Fig. 5, to a point a substantial distance back from the other free end of the portion 22 or approximately at the point 30, after which the narrow portion is free of attachment to the wide portion and is folded upon itself inwardly of its free end to produce the two parallel or laminated portions 31 which together form a long free tongue indicated generally by the numeral 32. The free end of the narrow portion at the tongue is then brought back and secured to the body of the wide portion 22, as indicated at 33. As will be seen upon reference to Fig. 6, this terminal portion 33 is located between the wide portion 22 and the main body portion of the narrow belt portion 23.

The numeral 34 designates a single strand woven or twisted wire cable of light weight. This cable is bent intermediate its ends like the cable 8 so as to provide two parallel strands. The two ends of the cable are bent around the D ring 29, as illustrated in Fig. 6, and the two loops of this cable, each of which is indicated by the numeral 35, are carried around the outside of the wide portion 22 between the same and the narrow portion 23 but instead of passing between the wide portion 22 and the end 33 of the narrow portion where this end lies against the wide portion 22, the strand loops pass between the end 33 and the overlying part of the narrow portion and then continue to the end of the tongue 32 between the laminations 31 which make up the tongue. The bend of the cable which forms the bight connection between the two loop portions 35 thereof is indicated at 36 and is located at the free end of the tongue where the narrow portion is bent back upon itself. It will thus be seen that this belt, like the belt shown in Fig. 1, is encircled by two connected loops of flexible cable and that these loops are continued into the free relatively long tongue which forms a part of the belt structure and which is employed to form an elongated adjustable loop such as is indicated at 37. As will be readily apparent from Fig. 1 and from a consideration of my issued patent previously referred to, this loop 37 which is formed from the tongue, engages with a ring 38 with which a snap fastener 39 is attached and this snap fastener is designed for connection with the D ring 29.

Connected with the body of the belt adjacent the inner end of the tongue 32 are a pair of guide loops 40 and between these loops there is secured a buckle ring 41 which carries a pin or finger 42. This buckle ring has the fixed part of the narrow portion 23 of the belt passed therethrough and the prong or finger also passes through this part of the narrow portion for engagement in one of a number of grommets 43 which are secured in the tongue 32.

The portions 22 and 23 of the belt are stitched together along lines lying upon the inner and outer sides of the two loops into which the cable strand is formed and the tongue portion 32 is also stitched longitudinally at the inner and outer sides of each of the loops so as to maintain the loops against movement by this stitching between laminations 31 and by the previously mentioned stitching between the portions 22 and 23 which constitute laminations for the belt proper. The grommets 43 lie between the loops of the strand in the tongue.

The tongue after being passed through the snap fastener ring 33 is folded back to form the loop 37 and is slipped through the guides 40 and through the buckle ring 41, so that the buckle finger 42 can be engaged through a grommet. After the belt has been adjusted by the wearer to the proper size, the wearer may then quickly open the belt for removal by disconnecting the snap fastener 39 from the ring 29 without changing the adjustment of the tongue in the buckle 41.

As will be readily apparent from the foregoing description of the two forms of the invention, the reinforcing loops of flexible cable which are built into the belts in the form of two strands which are connected together at one end by attachment to a fastening ring and at their other ends by an integral bight portion, will function to safeguard the life of the wearer even though the material of which the belts are made up should give way as a result of weakness and strain imposed thereon, because the strands form a continuous coupled band around the body and if the material of the belt should fail adjacent to the coupling buckles, the bights connecting the loop portions of the strands will catch over the buckle prongs when the belt begins to open and thus prevent the connected ends of the belts from coming apart.

The belt of Fig. 5 is also provided upon its inner side with a shield strip 44 like the strip 18 of the belt of Fig. 1, which strip covers the safety rings 45 which encircle the belt at the back thereof.

What is claimed is:

1. A safety belt structure, comprising a belt body consisting of at least two laminations of material, the laminations of the material being joined to form a loop, a buckle ring engaged through said loop and carrying a securing pin, a single length of stranded reinforcing cable having an end formed in an eye-splice and connected with said buckle loop and extending between said laminations to the opposite end of the belt and bent back upon itself and carried back between the laminations to said loop and having its other end formed in an eye-splice and connected at said loop with the buckle ring, the said laminations being stitched together along lines paralleling the strand, the body of the belt having grommeted apertures formed therethrough adjacent the end remote from the buckle ring to receive the securing pin of the buckle, the said grommeted apertures being located between the spaced portions of the strand.

2. A safety belt structure, comprising a belt body consisting of at least two laminations of material, the laminations of the material being joined to form a loop, a buckle ring engaged through said loop and carrying a securing pin, a single strand of reinforcing cable having an end joined to said buckle loop and extending between said laminations to the opposite end of the belt and bent back upon itself and carried back between the laminations to said loop and having its other end secured at said loop to the buckle ring, the said laminations being stitched together along lines paralleling the strand, the body of the belt having grommeted apertures formed therethrough adjacent the end remote from the buckle ring to receive the securing pin of the buckle, the said grommeted apertures being located between the spaced portions of the strand, the said laminations of the body at the end of the belt remote from the buckle being secured together around the turned portion of the strand and impregnated with a ruber bonding substance.

3. A reinforced safety belt construction, comprising a belt body made up of a length of relatively wide material and a length of a narrower material, the length of narrow material having one end turned back upon itself to form a loop and said turned back end being interposed between the body of the narrow material and the length of wide material, the said length of narrow material being carried from said loop around the major portion of the length of wide material and stitched thereto along a plurality of lines of stitching and then extending freely from the length of wide material and being turned back upon itself to form a free tongue of two laminations, the other end of the length of narrow material being secured between the body of such material and the length of wide material, a ring connected in said loop, a strand of flexible metal cable connected at an end with said link and carried around the belt between the lines of stitching securing the wide and narrow lengths of material together, said strand being continued into said tongue between the two laminations thereof to the free end of the tongue and turned back to be returned between the laminations of the tongue and between the wide and narrow portions to have its other end secured to said ring, a buckle ring secured to the belt remote from said ring and including a securing prong, the said tongue being adapted to be bent back upon itself to have its end extended through said buckle ring and having grommeted eyes for engagement by said prong, the tongue when bent back forming a long loop, and means engaged by said long loop for detachably coupling said long loop with the first ring.

CHARLES T. LEWIS.